Patented Aug. 26, 1952

2,608,515

UNITED STATES PATENT OFFICE 2,608,515

DI-METHYL-BUTYLSULFAMYLBENZOIC ACID

Carl Ziegler, Clementon, N. J., assignor to Sharp & Dohme, Incorporated, Philadelphia, Pa., a corporation of Maryland No Drawing. Application June 28, 1950, Serial No. 170,943

2 Claims. (Cl. 167—55)

This invention relates to a new compound which is effective as an adjuvant for use in conjunction with the administration of penicillin to provide an increase in the blood plasma penicillin concentration with a given dose of penicillin, thereby making possible very high penicillin blood levels, or permitting the use of smaller quantities of penicillin for providing a given blood level, or permitting the less frequent administration of penicillin while maintaining a penicillin blood level adequate for bactericidal or bacteriostatic purposes. The invention also relates to the preparation of various dosage forms in which this new compound is incorporated for administration by various routes.

Penicillin appears to be almost quantitatively excreted from the blood by the epithelial cells of the tubules, at least within plasma concentrations which have been explored, with the result that its rate of excretion from the blood stream is approximately five times that of materials which are excreted by glomerular filtration, alone, the tubular excretion accounting for about 80 (81)% and the glomeruli about 20 (19)%.

Various proposals have been made to overcome the difficulties due to the rapid elimination of penicillin, such as the administration of it in suspension in an oleaginous material, the mixture being administered by intramuscular injection. A second proposal which has been made has been to use a material such as diodrast or para-aminohippuric acid which, like penicillin, is selectively excreted by the tubules. Neither of these proposals has afforded a satisfactory solution to the problem, since the use of an oleaginous suspension of penicillin merely prolongs the time interval between injections and does not provide a high blood level of penicillin and, while the second proposal provides a means to inhibit the excretion of penicillin by the kidney tubules to a substantial extent, it does so at the expense of overloading the tubules with materials which they function to remove from the blood.

The present invention is based upon the discovery that removal of penicillin from the blood stream by the kidney tubules can be effectively blocked by the new adjuvant of this invention, para - (1,3 - dimethylbutylsulfamyl) - benzoic acid, having the general formula

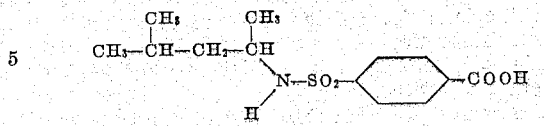

and its salts.

The new sulfamyl benzoic acid of the invention is generally made by first preparing a para-carboxybenzenesulfonyl halide by oxidation of para - toluenesulfonyl halide, or by preparing para - cyanobenzenesulfonyl halide by treating para-sulfamyl benzoic acid with phosphorus pentachloride. The para - carboxybenzenesulfonyl halide or para-cyanobenzenesulfonyl halide thus formed is reacted with the 1,3-dimethyl-butylamine, advantageously using an excess, for example, two to three equivalents, of the amine, and when the cyanobenzenesulfonyl halide reactant is used, hydrolyzing the product thus formed to the corresponding carboxyl derivative. The reaction is preferably carried out in the presence of a solvent, such as acetone or pyridine and the like, or in aqueous sodium hydroxide, and preferably with cooling. Any by-product formed during the reaction is removed by treating the reaction medium with a weak, alkaline substance, such as an aqueous sodium bicarbonate solution, filtering off the precipitated by-product, and then recovering the para-(1,3-dimethylbutylsulfamyl)-benzoic acid from the filtrate by acidification.

The preparation of the new compound of the invention is illustrated by, but not restricted to the following example:

*Example I.—Para - (1,3 - dimethylbutylsulfamyl) -benzoic acid.*—To 20.2 grams (0.2 mol) of 1,3-dimethyl-butylamine dissolved in 200 cc. of acetone, contained in an open flask provided with a stirrer, 22.1 grams (0.1 mol) of paracarboxybenzenesulfonyl chloride was added in portions with cooling and stirring. The stirring was continued for an additional one-half hour and the acetone then removed under vacuum. 300 cc. of cold water was added to the residue and the solution made acid with hydrochloric acid. The precipitate was removed by filtration and redissolved in a sodium bicarbonate solution. Some insoluble material was removed by filtration and the filtrate treated with hydrochloric acid, precipitating 10 grams of the crude product. After recrystallization from dilute alcohol, 9 grams of the purified product, melting at 207–208° C., was obtained.

An alternate method for preparing this compound is illustrated by the following example:

*Example II.—Para-(1,3-dimethylbutylsulfamyl)-benzoic acid.*—20.1 grams (0.1 mol) of para-cyanobenzenesulfonyl chloride was added to 20.2 grams (0.2 mol) of 1,3-dimethyl-butylamine in 50 cc. of pyridine. The mixture was allowed to stand overnight at room temperature after which it was poured into 500 cc. of ice water containing 50 cc. hydrochloric acid. The yellow oil which separated later solidified yielding 24 grams of crude para-(1,3-dimethylsulfamyl)-benzonitrile which, after three recrystallizations from isopropyl ether, melted at 79–80° C. The thus obtained benzonitrile was added to 150 cc. of a 10% sodium hydroxide solution and refluxed for two hours. The mixture was then treated with decolorizing charcoal, filtered and the filtrate treated with hydrochloric acid thereby producing a white precipitate. After filtration, the solid material was redissolved in a sodium bicarbonate solution and reprecipitated by the adition of hydrochloric acid. After two recrystallizations from dilute alcohol the para-(1,3-dimethylbutylsulfamyl)-benzoic acid melted at 208–209° C. Yield 13.5 grams.

The para-(1,3-dimethylbutylsulfamyl)-benzoic acid of this invention is relatively non-toxic, it is soluble in blood plasma and operates, when carried by the blood stream into contact with the tubules, to prevent their normal action in removing penicillin from the blood stream. The adjuvant itself is not excreted to any substantial extent by the tubules, and the available evidence indicates that on coming into contact with the epithelial cells of the tubules, it operates to block their action by interference with the normal functioning of the epithelial cells and does not inhibit the excretion of the penicillin by competing with it within the tubular functional capacity. Thus, the adjuvant is effective in eliminating or very radically reducing tubular excretion of penicillin in plasma concentrations around 10 mg. per 100 cc., which is about the threshold value for agents such as p-aminohippuric acid or diodrast. The highly effective adjuvant of this invention will reduce the excretion of penicillin by the tubules, at a blood plasma concentration of about 10 mg. per 100 cc. to almost zero, so that the actual elimination of penicillin from the blood stream becomes substantially that resulting from glomerular filtration, that is, about one-fifth the normal rate (ignoring plasma binding). The adjuvant itself is eliminated by the glomeruli.

The adjuvant can be administered orally or, when dissolved in an aqueous solution, it can be administered intravenously or intramuscularly, and in either case, in admixture with penicillin or separately therefrom.

Whether the adjuvant is administered in admixture with or separately from the penicillin, the quantity used should be such as to provide a concentration in the blood stream of adjuvant adequate to block substantially the excretory mechanism of the tubules. Maximum effect will be obtained with blood plasma concentrations of about 5 to 15 mg. per 100 cc., obtainable at dosage levels of about 4 to 16 grams per day orally and somewhat less than this intravenously. In a composition comprising both penicillin and the adjuvant, a ratio of about 0.5 gram of adjuvant to from 25,000 to 200,000 units of penicillin is advantageous.

In general, oral administration of the adjuvant at the rate of 4 to 16 grams per day is adequate to suppress the rate of penicillin excretion to an extent such that the blood level with a given dose of penicillin administered orally or intramuscularly in aqueous solution will be increased to as much as four times the level obtained without the use of the adjuvant.

The adjuvant may be prepared in any convenient dosage form, either alone or admixed with penicillin, such as in a compressed tablet, a dry filled capsule or a soft elastic capsule. It is to be understood, of course, that other ingredients, such as binders, diluents, excipients, antacid substances, or other inert or therapeutically active compounds may be incorporated into any selected dosage form along with the adjuvant or adjuvant plus penicillin, provided the added ingredient does not destroy the activity of either the adjuvant or penicillin. Similarly, the adjuvant and, if desired, the penicillin may be dispersed in an oleaginous base either alone or along with other suitable substances and filled into soft elastic capsules or an aqueous solution may be prepared and filled into ampuls. Other suitable dosage forms will be readily apparent to those skilled in the art, and it is not the purpose of this discussion to limit the mode of packaging or administration to the example specifically described below.

*Compressed tablets*

*Part I.*—4,548 grams of corn starch are hydrolyzed with 40 liters of hot water. 50,000 grams of para-(1,3-dimethylbutylsulfamyl)-benzoic acid are added to the wet paste and the entire mass is then granulated. The wet granulated material is passed through a coarse screen, spread thinly on trays and dried in an oven at about 60° C. for 24 hours and then passed through a No. 14 screen.

*Part II.*—131 grams of ethyl cellulose (having a low viscosity, e. g., 20 centipoise) are dissolved in 3.5 liters of anhydrous alcohol with the aid of gentle heating and in an atmosphere controlled at 30% relative humidity at 25° C. In a separate container 6,666 grams of penicillin G sodium, 5,425 grams of powdered sodium bicarbonate and 1,618 grams of dried corn starch are intimately mixed together and then passed through a fine screen. This mixed powder is granulated with the warm solution of ethyl cellulose, adding additional anhydrous alcohol, if necessary, to form good granules. The granulated material is passed through a coarse screen, spread on trays and dried in an oven at 55° C. for 14 hours and then passed through a No. 20 screen.

The granules obtained in Part I and Part II are combined and mixed with 4,927 grams of granular sodium bicarbonate and then 6,660 grams of dried corn starch are intimately mixed therein. After thorough stirring, 7,000 grams of dried talc and 525 grams of magnesium stearate are added and the mixture again thoroughly stirred. This final mixture is compressed into tablets using a one-half inch die and flat face, double edge punches yielding 100,000 tablets each weighing 0.875 gram and containing 0.5 gram of para-(1,3-dimethylbutylsulfamyl)-benzoic acid and 100,000 units (plus 10% excess) of penicillin G sodium.

In compositions containing penicillin, it is advisable, in accordance with customary practice, to include an excess of the penicillin, for example, a ten per cent excess over the label-claimed quantity in accordance with present practice. An excess of penicillin introduces no difficulty save its cost. The penicillin used may be any of the forms available for use, such as the calcium, sodium, potassium, procaine, and the like salts of amorphous or crystalline penicillin.

Having now particularly described the invention, what is claimed is:

1. An adjuvant which is a member of the group consisting of para-(1,3-dimethylbutylsulfamyl)-benzoic acid having the formula

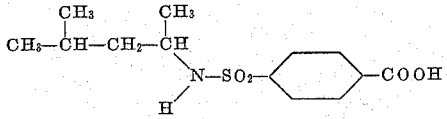

and its non-toxic, water-soluble salts.

2. A composition suitable for therapeutic use, comprising penicillin and an adjuvant which is a member of the group consisting of para-(1,3-dimethylbutylsulfamyl)-benzoic acid having the formula

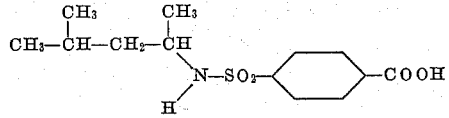

and its non-toxic, water-soluble salts, the quantity of adjuvant and penicillin in the composition being in the ratio of 0.5 gram of adjuvant to from 25,000 to 200,000 units of penicillin.

CARL ZIEGLER.

REFERENCES CITED

The following references are of record in the file of this patent:

UNITED STATES PATENTS

| Number | Name | Date |
|---|---|---|
| 2,162,211 | Andersen | June 13, 1939 |

OTHER REFERENCES

Reid: "Prolongation of Penicillin Activity with Penicillinase-Inhibiting Compounds," Proc. Soc. Exptl. Biol. and Med., November 1946, pp. 438–443. 167/65 p.

So-Hoo: "Activity of Penicillin Combined with Other Anti-Streptococcal Agents . . ." Archives Biochemistry. September 1944, pages 99–106. 167/65 p.

Meads: "Caronamide and Penicillin," J. Am. Med. Assoc., November 20, 1948, pages 874–877.

Pratt et al.: "Antibiotics," Lippincott Co., 1949, pages 112–116. (Book in Division 43.)